United States Patent
Wiswell et al.

(10) Patent No.: US 6,205,319 B1
(45) Date of Patent: Mar. 20, 2001

(54) DUAL PHASED-ARRAY PAYLOAD CONCEPT

(75) Inventors: Eric R. Wiswell, Torrance; Daniel R. Lane, Santa Monica; Harvey L. Berger, Redondo Beach; Kenneth E. Westall, Seal Beach; Ronald P. Smith, Redondo Beach; Allen F. Conrad, West Hills; Konstantinos Makrygiannis, Torrance; Mark K. Christopher, Redondo Beach; Mark Kintis, Manhattan Beach, all of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/157,061

(22) Filed: Sep. 18, 1998

(51) Int. Cl.[7] .................................................. H04Q 7/20
(52) U.S. Cl. .......................... 455/12.1; 455/427; 455/13.3
(58) Field of Search .................................. 455/12.1, 13.1, 455/13.3, 62, 427, 428, 429, 430, 431, 457; 342/354, 359, 368, 371, 372, 373, 457; 244/158 R, 164, 171

(56) References Cited

U.S. PATENT DOCUMENTS

| | | | |
|---|---|---|---|
| 5,585,803 | * 12/1996 | Miura et al. | 342/372 |
| 5,736,959 | * 4/1998 | Patterson et al. | 342/354 |
| 5,754,138 | * 5/1998 | Turcotte et al. | 342/373 |
| 5,754,139 | * 5/1998 | Turcotte et al. | 342/373 |
| 5,856,804 | * 1/1999 | Turcotte et al. | 342/371 |
| 5,974,315 | * 10/1999 | Hudson | 455/427 |
| 5,982,341 | * 11/1999 | Rossi et al. | 455/12.1 |
| 6,006,069 | * 12/1999 | Langston | 455/62 |
| 6,031,490 | * 2/2000 | Forssen et al. | 342/457 |
| 6,032,041 | * 2/2000 | Wainfan et al. | 455/427 |
| 6,061,562 | * 5/2000 | Martin et al. | 455/431 |
| 6,064,859 | * 5/2000 | Leopold et al. | 455/13.1 |
| 6,108,538 | * 8/2000 | Blasiak et al. | 455/428 |

* cited by examiner

*Primary Examiner*—Nay Maung
(74) *Attorney, Agent, or Firm*—Michael S. Yatsko

(57) ABSTRACT

A dual phased array payload (100) for use onboard a communications satellite is disclosed. The payload includes one or more phased array receive antennas (102–108) including numerous individual receiving elements distributed in a predetermined configuration. Each of the individual radiating elements is selectively adjustable in amplitude and phase to achieve scanning beams for receiving information transmitted from the ground in an uplink beam. The payload includes a packet switch (114) connected to the phased array receive antennas (102–108). The packet switch (114) includes a set of inputs and a set of outputs. The set of inputs are selectively connectable to the set of outputs. The payload (100) includes one or more phased array transmit antennas (120–126) connected to the packet switch (114). The phased array transmit antennas (120–126) include numerous individual radiating elements distributed in a predetermined configuration.

11 Claims, 1 Drawing Sheet

DUAL PHASED-ARRAY PAYLOAD CONCEPT

BACKGROUND OF THE INVENTION

The present invention relates to a communications satellite transmission and reception architecture that includes phased array antennas. In particular, the present invention relates to a satellite payload that coordinates a transmit phased array antenna, packet switch, and a receive phased array antenna.

Satellites are a common feature of modern communications networks and have long provided communications services on a global scale. A communications satellite often flies in a geostationary (GSO) orbit (at approximately 35,784 km altitude with an inclination and eccentricity of zero) so that the satellite always appears in the same spot in the sky. Satellites, however, may also be placed in other orbits, including Non-geostationary orbits (NGSO).

A NGSO satellite typically orbits between 250 and 12000 km above the Earth. NGSO satellites orbit the Earth independently of the Earth's own rotation and therefore do not maintain a constant location in the sky. Because the orbit of a NGSO satellite periodically takes the NGSO satellite over various locations on the Earth, the NGSO satellite may be used to provide periodic communications services to those locations. A constellation of many NGSO satellites may be used to provide nearly continuous coverage to virtually all areas of the Earth.

As an example, Teledesic LLC, located in Kirkland Wash., United States, has proposed a NGSO constellation referred to as the Teledesic Network which flies 288 NGSO satellites. The Teledesic Network incorporates 12 orbital planes with 24 NGSO satellites per plane. Each orbital plane is approximately perpendicular to the equator and separated from adjacent orbital planes by approximately 15 degrees. The altitudes of the satellites in each orbital plane are staggered so that the satellites pass below and above one another at the North and South poles, where each orbital plane converges.

Two sets of intersatellite links (ISL) connect the satellites in the Teledesic Network. North-South links provide continuous connections between the satellites in individual orbital planes. Any first satellite in an orbital plane has a connection to a second satellite ahead of its current position and a third satellite behind its current position. Similarly, East-West links provide a connection between the satellites in a first orbital plane and the satellites in a second orbital plane and a third orbital plane on either side of the first orbital plane (the adjacent orbital planes).

In the past, satellite antenna technology has provided GSO and NGSO satellites with Multi-Beam Antennas (MBAs) which provide transmission and reception of fixed size and direction beams. Because the MBAs are fixed, the satellite using an MBA antenna cannot adjust its antenna pattern to accommodate the variations in user demand in a region of interest (ROI) as the satellite moves overhead. For example, an MBA pattern setup to cover the United States would not efficiently cover South America.

As a result, satellites in the past have required payloads using complex configurations of MBAs. Each MBA is selectively activated or deactivated to provide coverage for a ROI as the satellite moves from one ROI to another ROI. The complex configurations of MBAs require the satellite to include a complex switching network to activate and deactivate the MBAs. Furthermore, the complex switching network and additional MBAs increase the power demand on the satellite's limited power supply as well as drive up the size and weight of the satellite (making the satellite more expensive to build, transport, and launch).

In the past, satellites have attempted to cope with the complexity of MBA design by purposefully creating payloads with sub-optimal MBA configurations using fewer MBA components. Because an MBA design providing optimal coverage for one ROI generally results in very poor coverage for the other ROIs, a compromised, sub-optimal MBA configuration is typically used. The sub-optimal configuration reduces the complexity of the MBA design and relieves the very poor coverage for the other ROIs by providing sub-optimal coverage for all ROIs. The sub-optimal configuration also reduces the amount of communications capacity available to the ROIs and thereby limits the amount of information that may be transmitted and received as the satellite moves overhead. Revenues are correspondingly reduced.

A need has long existed in the industry for a satellite payload design that eliminates the added complexity, power requirements, and cost of complex MBA configurations.

BRIEF SUMMARY OF THE INVENTION

It is an object of the present invention to provide a communications satellite with an increased optimality in antenna and payload architecture.

It is another object of the present invention to lower the cost, size, and weight of a communications satellite.

Yet another object of the present invention is to provide a communications satellite with the ability to flexibly adjust its uplink and downlink beam coverage using phased array antennas.

Another object of the present invention is to allow a communications satellite to route information between a receive phased array antenna and a transmit phased array antenna using a packet switch.

The present invention provides a dual (i.e., including both transmit and receive antennas) phased array payload for use onboard a communications satellite. The payload includes a phased array receive antenna including numerous individual receiving elements distributed in a predetermined configuration. Each of the individual radiating elements has a low noise amplifier (LNA) and is selectively adjustable in phase and amplitude to achieve scanning beams for receiving information transmitted from the ground in an uplink beam.

The payload also includes a packet switch connected to the phased array receive antenna. The packet switch includes a set of inputs and a set of outputs. Each input is selectively connectable to one or more outputs.

In addition, the payload includes a phased array transmit antenna connected to the packet switch. The phased array transmit antenna includes numerous individual radiating elements distributed in a predetermined configuration. Each of the individual radiating elements has a power amplifier, as well as a controllable amplitude and phase excitation used to electronically steer a downlink beam produced by the radiating elements in combination.

A payload computer is connected to the packet switch. The payload computer generates outputs that control the connection of the packet switch inputs to the packet switch outputs. The payload may further include a downconverter connected to the phased array receive antenna, an analog to digital converter connected to the downconverter, and a demodulator/decoder connected to the analog to digital converter. An encoder/modulator may additionally be connected to the packet switch, and an upconverter may also be connected to the encoder/modulator and the phased array transmit antenna.

The communications satellite may additionally communicate with the ground, or with other satellites, using a beacon transmitter and receiver. The beacon transmitter and receiver operate under control of the payload computer to transmit and receive command, control, and status information.

DETAILED DESCRIPTION OF THE INVENTION

Figure 1:
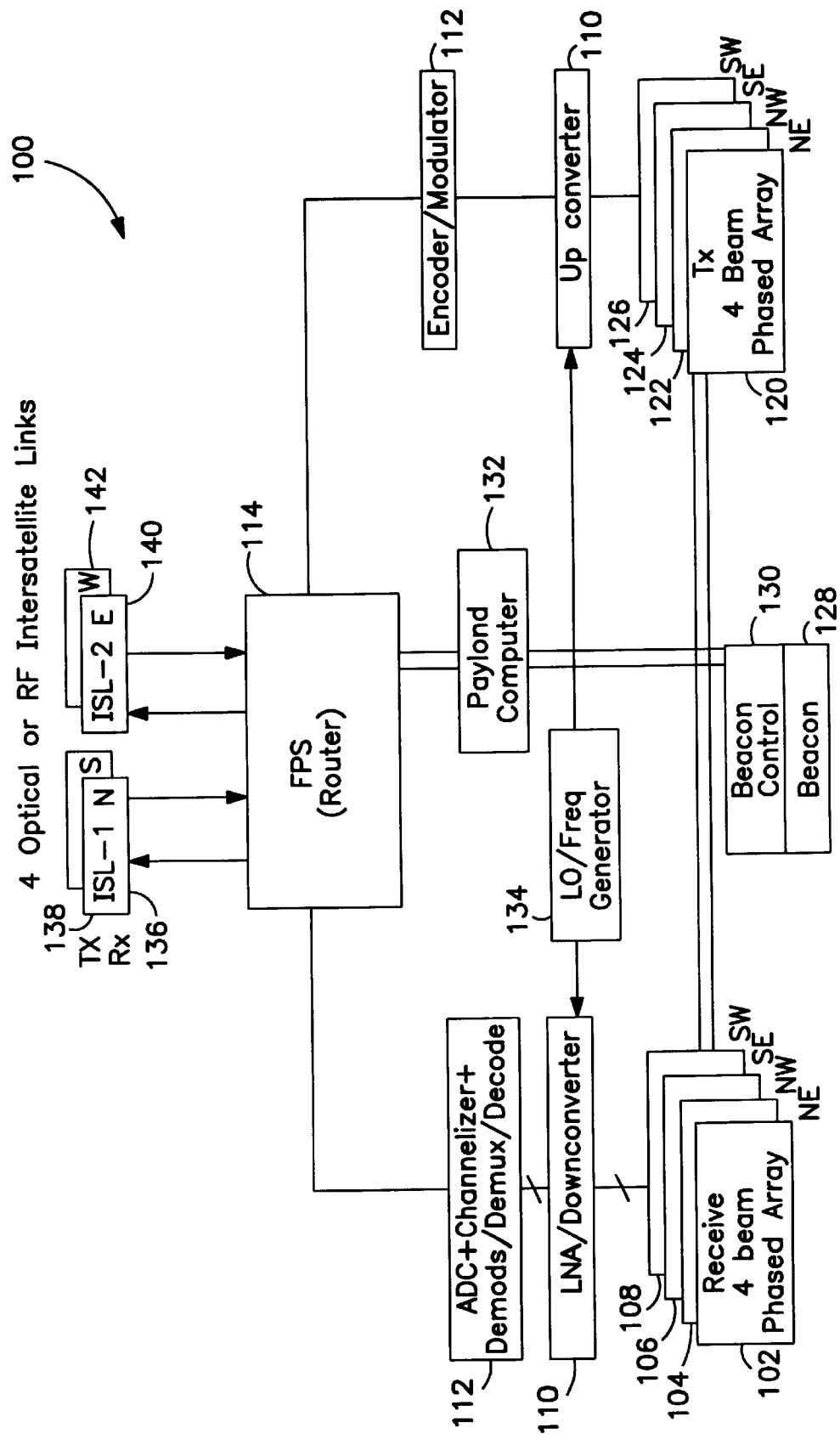
FIG. 1 illustrates one embodiment of the dual phased array payload of the present invention, including a phased array receive antenna, packet switch, and phased array transmit antenna.

Turning now to FIG. 1, that figure shows one embodiment of the dual phased array payload 100 according to the present invention. The payload 100 includes the phased array receive antennas 102–108 ("receive antennas") connected to a low noise amplifier and next to downconverter 110. The downconverter 110 is in turn connected to channel recovery circuitry 112 including an Analog to Digital Converter (ADC), a channelizer, and demodulators/decoders. A packet switch 114 is included and connected to the channel recovery circuitry 112 as well as an encoder/modulator 116. An upconverter 118 is connected between the encoder/modulator 116 and the phased array transmit antennas 120–126 ("transmit antennas").

A beacon 128 and associated beacon control 130 are also included. A payload computer 132 controls the operation of the payload 100, and in particular, is connected to the packet switch 114 and the beacon control 128. A frequency generator 134 is provided to produce the frequencies required by the downconverter 110 and the upconverter 118. The payload may also include an ISL North transmitter and receiver pair 136 and an ISL South transmitter and receiver pair 138 as well as an ISL East transmitter and receiver pair 140 and an ISL West transmitter and receiver pair 142.

The phased array receive antennas 102–108 replace the complex MBA antenna discussed above and receive RF energy forming uplink beams. The uplink beams may, for example, contain RF energy at approximately 28.6–29.1 GHz and contain numerous individual channels. Similarly, the transmit antennas may be used to form downlink beams containing one or more channels, for example, in the 18.8–19.3 GHz band.

Each phased array antenna is composed of a group of individual radiators which are distributed in a predetermined configuration, for example a linear or two-dimensional spatial configuration. The radiators may be implemented, for example, as dipoles, slots, open-ended waveguides, spirals, microstrip or patch elements.

In accordance with phased array antenna operation principles, the amplitude and phase excitation of each radiator is individually controlled to form a radiated beam of any desired shape. The direction of the beam in space is controlled electronically by adjusting the phase of the excitation signals at the individual radiators. As a result, the phased array antenna may steer a transmitted beam while the phased array antenna remains fixed in space. In other words, no mechanical motion is required to accomplish beam steering. During reception, each radiator may be monitored or scanned in turn to determine the RF energy incident upon the radiator to recover a transmitted RF signal. Phased array antennas suitable for use with the present invention are available from TRW, Inc., Redondo Beach Calif. 90278. Additional information on phased array antennas may be found in the *Antenna Engineering Handbook* (Richard C. Johnson, ed.) 20-1–20-67 (1993). Pages 20-1–20-67 of the Antenna Engineering Handbook are incorporated herein by reference in their entirety.

No particular number of receive antennas or transmit antennas is required; one or more of each may be used. In certain preferred embodiments, however, power dissipation requirements may suggest a certain structure for the transmit antennas. For example, current technology allows approximately 30% of DC power applied to the transmit antennas to result in useful RF power. Thus, 70% of the DC power generally turns into heat. As a result, several smaller transmit antennas 120–126 that generally point NE., NW., SE., and SW. (and that dissipate heat more readily) may be used instead of one large transmit antenna.

The receive antennas 102–108 are connected to the low noise amplifier and downconverter 110. The downconverter 110 uses a mixer to shift the frequency of the received RF energy to an intermediate frequency that may be operated on by the channel recovery circuitry 112. The frequency generator 134 is responsible for generating the frequencies used by the downconverter 110 and may use Voltage Controlled Oscillators (VCOs), Numerically Controlled Oscillators (NCOs) and the like.

The channel recovery circuitry 112 includes an analog-to-digital converter (ADC) to convert the received uplink beam to digital samples. A channelization function follows which separates out the individual channels in the uplink beam and routes the channels to demodulators. The demodulators/decoders remove modulation and encoding applied to the uplink beam, for example Quadrature Phase Shift Keying (QPSK) or 16 level Quadrature Amplitude Modulation (16-QAM). The resulting demodulated digital bits from each channel are input to the packet switch 114.

In most instances, information sent in an uplink beam will be broken into discrete packets. The demodulated and decoded digital bits recovered by the channel recovery circuitry 112 therefore represent those packets. The packets, in turn, typically include header information and data information. The header information may include, for example, synchronization information, error correcting information, and routing information that describes the source and destination for the data information. The payload computer 132 may use the routing information in part to control the packet switch 114. Packets may also be routed to or from the payload computer 132 to facilitate communications resource control.

The packet switch 114 generally includes N inputs and M outputs and is able to connect the N inputs to any of the M outputs. In operation, the N inputs may be assigned to each uplink or intersatellite link (ISL) channel and the M outputs may be assigned to each downlink or intersatellite link (ISL) channel. As one example, the routing information may indicate that a particular packet recovered from the first uplink channel is destined for a particular region of interest (ROI). The payload computer 132 may then determine which downlink beam covers that ROI and adjust the packet switch 114 to connect the input used for the packet to the output used to generate the downlink beam covering the ROI. The packet switch also supports functions such as multicast (in which a single packet is forwarded to more than one downlink beam or ISL) and broadcast (in which a single packet is forwarded to all downlink beams and ISLs). A packet switch suitable for use in the present invention is available from TRW, Inc., Redondo Beach Calif., 90278.

As noted above, the outputs of the packet switch 114 are used to generate downlink or intersatellite links (ISL) beams. The first step in generating downlink beams is performed by the encoder/modulator 116 which takes digital bits from the packet switch 114 and generates symbols that may simultaneously carry multiple bits. Modulation added by the modulator 116 may include, for example, QPSK (two bits per symbol) or 8-PSK (three bits per symbol). The upconverter 118 shifts the symbols produced by the modulator 116 up in frequency for transmission, typically using a mixer. As an example, the upconverter 118 may use an approximately 19 GHz frequency (generated by the frequency generator 134) to generate downlink beams in the 18.8–19.3 GHz range. The downlink beams are applied to the transmit antennas 120–126, whose individual radiating elements are controlled by the payload computer 132 for electronic steering.

The payload 100 may optionally include optical or radio frequency (RF) intersatellite links 136–142. For example, an ISL North transmitter and receiver 136 and an ISL South transmitter and receiver 138 may be provided to establish communications between satellites in the same orbital plane. Similarly, an ISL East transmitter and receiver 140 and an ISL West transmitter and receiver 142 may be provided to establish communications between satellites in adjacent orbital planes. The North, South, East, and West links may be implemented with laser optics or RF packages and may be used to interconnect the communications satellites in a network. Worldwide routing of packets may then flow through the payload 100, either to additional communications satellites over the intersatellite links 136–142, or to and from the ground using the receiver antenna 102–108 and the transmitter antennas 120–126.

Additionally, the payload 100 may include a beacon 128 and associated beacon control 130. The beacon 128 includes a transmitter and receiver that operate on RF frequencies to transmit and receive information to and from the ground. The beacon control 130 receives information to transmit from the payload computer 132 and forwards to the payload computer 132 information received by the beacon 128. The beacon control 130 may also include hardware for modulation, demodulation, upconversion, downconversion, and analog to digital conversion.

The beacon provides a dedicated control channel between the payload 100 and the ground (although the beacon could conceivably be pointed at another satellite as well). The control channel may be used to carry command, control, and status information regarding the frequencies in use by the transmit antennas 120–126 and the receive antennas 102–108, the present amount of bandwidth available at the payload 100, communication or call setup and teardown information, synchronization information and the like. The payload computer 132 may also, for example, use the control channel to indicate to the ground any errors or malfunctions the payload 100 is experiencing, or may use the control channel to transmit a signal that a ground station searches for to determine whether a satellite is passing overhead and is available for service.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features which come within the spirit and scope of the invention.

What is claimed is:

1. A dual phased array payload architecture for use onboard a communications satellite, said architecture comprising:
    a phased array receive antenna including a plurality of individual radiating elements distributed in a predetermined configuration, each of said individual radiating elements selectively adjustable in phase and amplitude to provide scanning beams for receiving information transmitted from the ground in an uplink beam;
    a packet switch connected to said phased array receive antenna, said packet switch including a set of inputs and a set of outputs, said inputs selectively connectable to said set of outputs;
    a phased array transmit antenna connected to said packet switch, said phased array transmit antenna including a plurality of individual radiating elements distributed in a predetermined configuration, each of said individual radiating elements having a controllable amplitude and phase excitation to generate and electronically steer downlink beams; and
    a payload computer connected to said packet switch, said payload computer including outputs controlling the connection of said set of inputs to said set of outputs, controlling the scanning of said radiating elements in said phased array receive antenna, and controlling the amplitude and phase excitation of said radiating elements in said phased array transmit antenna.

2. The dual phased array payload of claim 1, further comprising:
    a downconverter connected to said phased array receive antenna;
    an analog to digital converter connected to said downconverter; and
    a demodulator/decoder connected to said analog to digital converter.

3. The dual phased array payload of claim 2, further comprising:
    an encoder/modulator connected to said packet switch;
    an upconverter connected to said encoder/modulator.

4. The dual phased array payload of claim 1, further comprising a beacon transmitter and receiver connected to said payload computer.

5. The dual phased array payload of claim 1, further comprising an intersatellite link (ISL) North transmitter and receiver and an ISL South transmitter and receiver.

6. The dual phased array payload of claim 5, further comprising an ISL East transmitter and receiver and an ISL West transmitter and receiver.

7. The dual phased array payload of claim 1, further comprising at least one additional phased array receive antenna connected to said packet switch.

8. The dual phased array payload of claim 1, further comprising at least one additional phased array transmit antenna connected to said packet switch.

9. The dual phased array payload of claim 1, wherein said communications satellite orbits in a non-geostationary earth orbit.

10. The dual phased array payload of claim 1, wherein said phased array receive antenna is oriented in approximately a Northeast direction and further including:
    a second phased array receive antenna oriented in approximately a Northwest direction and connected to said packet switch;
    a third phased array receive antenna oriented in approximately a Southeast direction and connected to said packet switch; and
    a fourth phased array receive antenna oriented in approximately a Southwest direction and connected to said packet switch.

11. The dual phased array payload of claim 1, wherein said phased array transmit antenna is oriented in approximately a Northeast direction and further including:
    a second phased array transmit antenna oriented in approximately a Northwest direction and connected to said packet switch;
    a third phased array transmit antenna oriented in approximately a Southeast direction and connected to said packet switch; and
    a fourth phased array transmit antenna oriented in approximately a Southwest direction and connected to said packet switch.

* * * * *